E. C. SOPER.
TREATMENT OF PHOSPHATES.
APPLICATION FILED JAN 12, 1918.

1,396,975.

Patented Nov. 15, 1921.
2 SHEETS—SHEET 1.

WITNESSES:

Ellis C. Soper  INVENTOR.
BY Gifford Bull
his ATTORNEYS

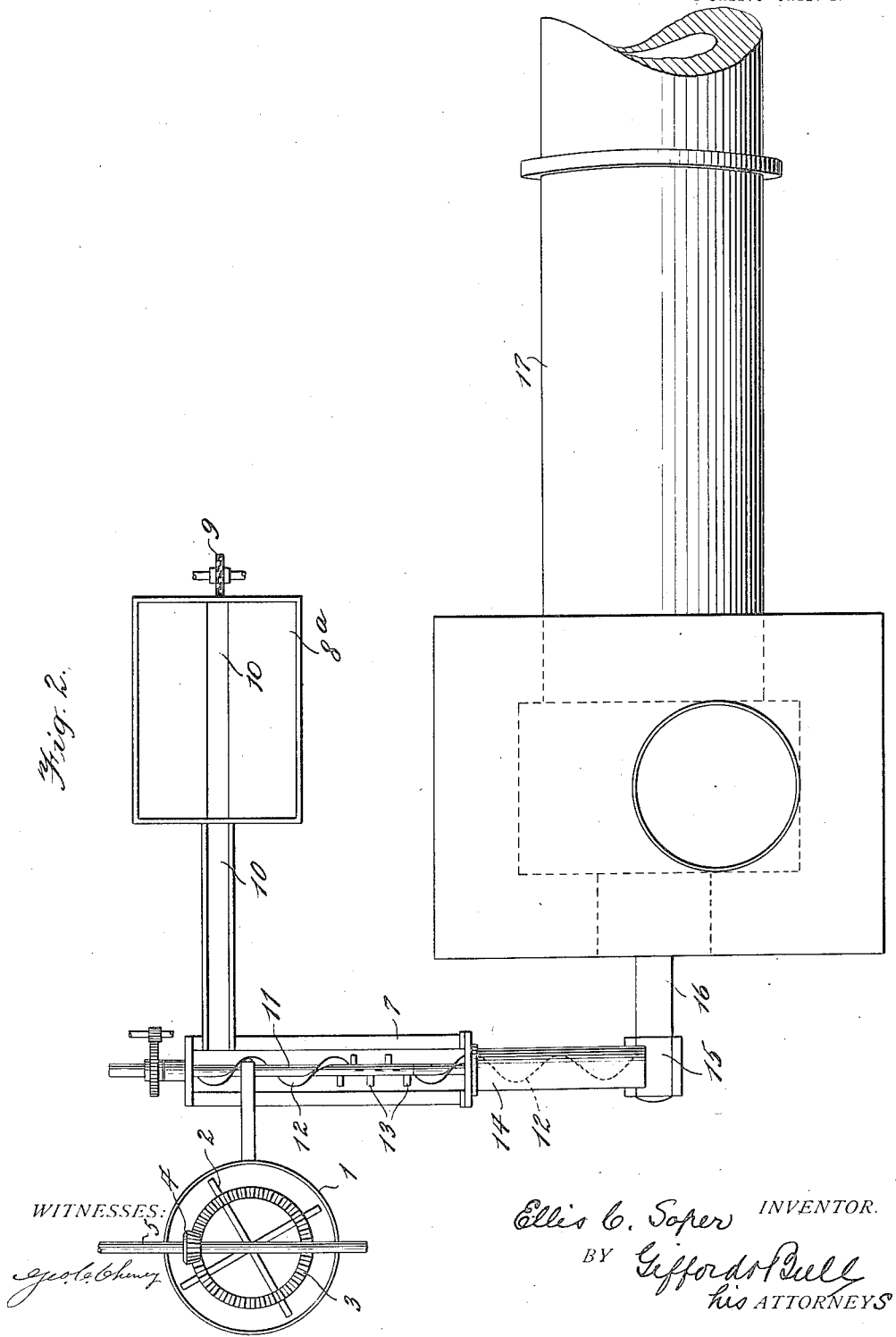

UNITED STATES PATENT OFFICE.

ELLIS C. SOPER, OF CHATTANOOGA, TENNESSEE.

TREATMENT OF PHOSPHATES.

1,396,975.  Specification of Letters Patent.  Patented Nov. 15, 1921.

Application filed January 12, 1918. Serial No. 211,477.

*To all whom it may concern:*

Be it known that I, ELLIS C. SOPER, a citizen of the United States, residing at Chattanooga, in the county of Hamilton and State of Tennessee, have invented certain new and useful Improvements in the Treatment of Phosphates, of which the following is a specification.

My invention relates to new and useful improvements in the treatment of phosphates, and particularly relates to the conversion of insoluble phosphates, for example, calcium phosphates, phosphate of iron, and phosphate of alumina, or combinations thereof into citrate soluble form, rendering them suitable for use as fertilizers.

The invention is equally applicable to the treatment of phosphates of lime, such as are known as Tennessee phosphates and Florida phosphates: phosphates of iron and alumina which occur principally in the West Indies, and phosphates of alumina known as apatite. The invention is also applicable to the treatment of so-called "soft phosphates" which are found in large quantities in Florida, and low grade phosphates, which do not contain sufficient phosphoric acid for commercial treatment by processes hitherto known.

The invention consists in the improvements to be more fully described hereinafter, and the novelty of which will be particularly pointed out and distinctly claimed.

I have fully and clearly illustrated in the accompanying drawings one form of apparatus adapted to carry out the novel process to be hereinafter described constituting my invention, and wherein—

Fig. 2 is a top plan view thereof.

Figure 1:
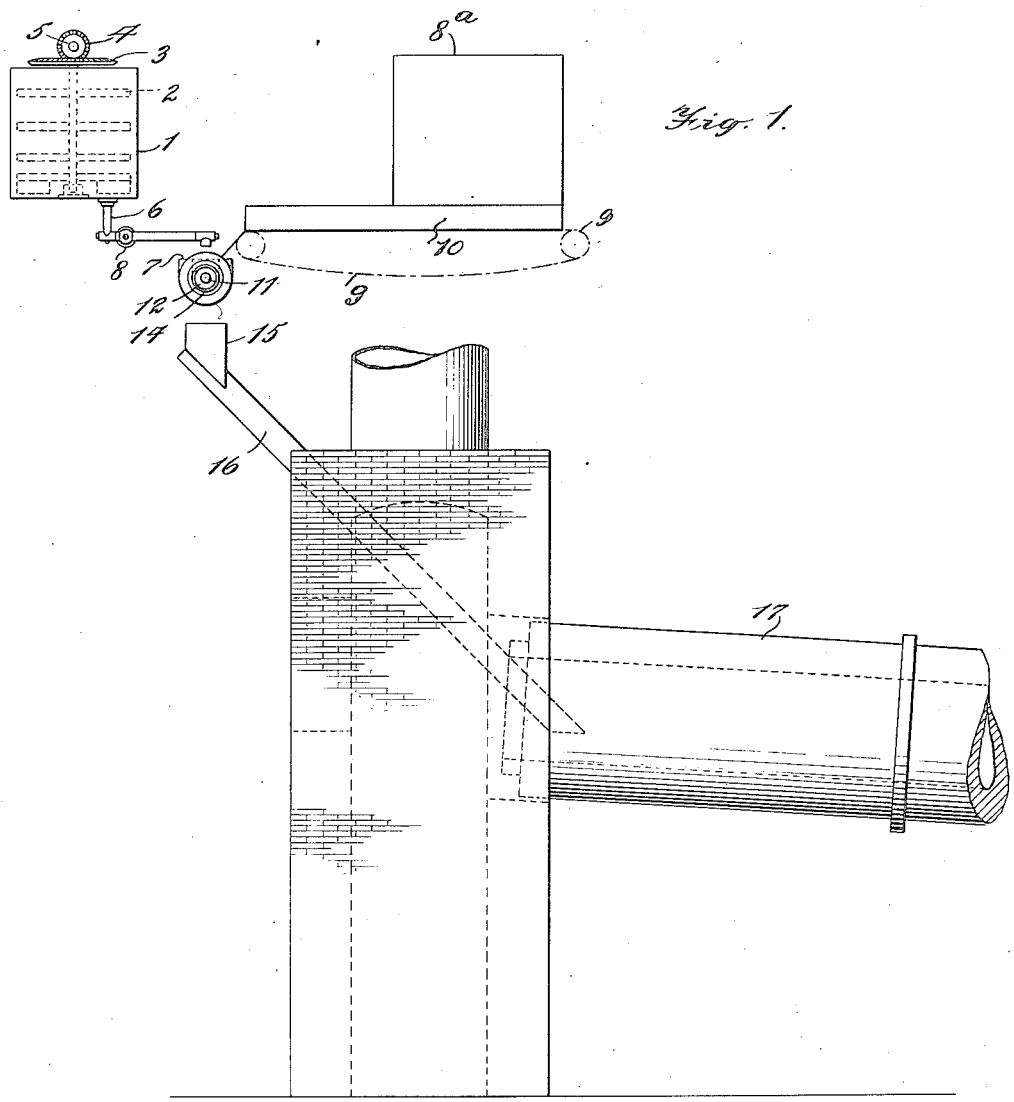
Figure 1 is a view in side elevation of said apparatus.

It has been proposed, previous to my invention, to treat insoluble phosphates, for example phosphate of lime, with the addition of alkali metal salts and other alkalis and also hydrocarbons and carbonaceous materials, such for example, as coal, coke, pitch, asphalt, etc., acting as reagents with heat at a high temperature to convert the same into citrate soluble form, but such previous processes have proven commercially impractical, as far as I am aware, because they are not adapted for being carried out continuously, and to a commercial extent, and furthermore because it was difficult, if not impossible, when working under commercial conditions to impart to the material a vesicular condition, which appears to be essential to the proper conversion of the mass of material from insoluble to citrate soluble form.

I have discovered in order to provide for an efficient process which will successfully produce a commercial yield of citrate soluble phosphoric acid from the raw phosphate material, it is necessary to produce a complete and intimate mixture of the reagent with the raw phosphate material, and that this is best done by finely grinding the materials to such an extent and with the addition of water in such amount that the mixture is fluid, thereby causing the reagent to be thoroughly disseminated throughout the mass and be in intimate contact with the phosphatic material, and then to treat this mixture at the proper temperature, preferably in a rotary kiln. Treatment of this fluid material in a rotary kiln is difficult, because the wet or fluid mixture adheres to the inner lining of the kiln at the inlet portion thereof, resulting in building up, known as "ringing" in rotary kiln practice, of the mixture on the inner surface of the kiln to such an extent that said material will not pass rapidly through the kiln, and be properly subjected to the heat thereof, or will drop from the surface of the kiln in such large masses and in such a solid or unporous condition, that the heat cannot find access evenly and efficiently throughout the entire mass. This is due to the fluid condition of the mixture, which appears necessary to the proper mixture of the ingredients, causing the material to adhere to the kiln. In order to overcome this difficulty, I have discovered that the mixture with the fluid material of a stiffener or drier which will reduce the initial fluid condition to a substantially plastic state, will prevent the adherence of the mixture to the kiln, and will insure the proper passage of the same through the kiln and the proper dissemination of the heat throughout the mass.

My invention generally consists in mixing with the insoluble phosphate a reagent which accelerates the conversion of the phosphatic material under proper heat, from insoluble to citrate soluble form, and also a stiffening or drying material which may be disseminated throughout the mixture of phosphate and reagent, to reduce the fluidity or moisture percentage of the mass preferably to a substantially plastic consistency, which stiffening or drying material shall be combustible or volatile, so that when the entire mixture is submitted to high temperature, for example, a calcining temperature, the combustible or volatile material will be burned or volatilized out of the mass, thereby leaving the mass of phosphate vesicular, in order that the reagent and heat may act effectively to bring about the proper conversion of the phosphate from insoluble to citrate soluble form. This combustible or volatile material may or may not have any chemical effect in the process, that is it may act as a reagent, for example, it may consist of carbonaceous material, for example finely ground coal or coke, sawdust or hydrocarbon material, which will burn quickly when the mass or mixture is initially subjected to heat, for example, in a rotary kiln. Other advantages accruing from the use of this combustible or volatile material will appear in the following description.

In carrying my invention into effect, I may proceed as follows:—

The phosphatic material, for example, phosphate of lime, such as Florida pebble phosphates, is ground either together or separately with a proper reagent, for example, sodium sulfate, sodium bi-sulfate, or sodium carbonate, in varying proportions, depending upon the quality of the phosphate material used as regards its phosphoric acid content. For example, where the phosphate material is a phosphate of lime, such as is known as "Florida pebble phosphate" which may contain approximately 31% phosphoric acid in an insoluble form, the rock is pulverized with 20 to 40% of sodium bi-sulfate or niter cake to a fineness of about 98% or more through a sieve of 100 meshes to the inch. If salt cake, sodium sulfate, is used, a relatively smaller percentage is required, for example, about 15 to 30%. The phosphate and the reagent may be ground dry and then have an addition of about 40% of water, or be ground wet with said amount of water, which is preferable, due to the saving in power and the fact that a more intimate mixture is secured. If coal or coke be used, the percentage will be about 20 to 40 per cent. by weight of the phosphatic material, or a combination of the said alkaline and carbonaceous or hydrocarbon reagents may be used. This mixture may now be subjected to high temperature in order to bring about the conversion of the phosphate from insoluble to citrate soluble form, but it is not practical commercially to do so, particularly in the apparatus which at present appears to be best adapted to the purpose, i. e. a rotary kiln, because the moist fluid mass when introduced into the kiln will adhere to the lining of the kiln so that the mass is not properly and evenly subjected to the heat and the conversion is inadequate or incomplete. After a series of experiments I have discovered that the mixture of a certain amount of a stiffener or drier, preferably ground coal, coke or sawdust, with the fluid mixture, and then feeding the same into the kiln, the material will not adhere to the lining, and that the burning or volatilizing of the material assists in producing the desired vesicular condition. The kiln or furnace may be fired in any usual or suitable manner, for example, with oil, gas or pulverized coal, and the maximum temperature will vary from 2300 to 2600 degrees F., depending upon the material being treated. The action of the heat on the material acts to burn out or volatilize the stiffener or drier, thus assisting in vaporizing the water present in the mass, and also producing the vesicular condition above mentioned. The reagent is next disassociated and practically all driven off, the resulting product being in the form of soft clinkers, varying in size from $\frac{1}{8}$ to $\frac{1}{2}''$ in diameter. They are extremely vesicular and easily crushed between the fingers.

The time of treatment by the heat may vary from 30 minutes to 90 minutes according to the type of furnace used. In a rotary kiln of 40 feet length at the temperature stated at a revolution of 70 to 90 seconds, the desired results were obtained in about one hour; in a fifteen foot kiln about 30 minutes, with about one revolution to a minute. It is preferable to have the pitch of the kiln from $\frac{3}{4}$ inch to $1\frac{1}{4}$ inch to the foot.

The amount of the stiffener or drying material added is such as to obtain the proper mechanical condition of the mass to facilitate feeding to the kiln, and sufficient to make a consistency which will make the mixture substantially plastic or moldable will accomplish the desired result. The stiffener or drier if sawdust, may be approximately 75% by volume of the crushed phosphatic material treated. If coal or coke be used, from 30 to 75 per cent. by volume will serve the purpose.

The stiffener or drier need not necessarily be coke or sawdust, as in cases where the phosphate contains large amounts of silica, for example, say 10 or 12%, the stiffener or drier may consist of calcium carbonate or magnesium carbonate, which, in addition to acting as a stiffener or drier combines chemically with silica forming calcium or magnesium silicate which allows the phosphate to be made citrate soluble by heat and the reagent used. In cases where the silica content of the phosphate mass is more than 8% it is desirable to employ calcium carbonate or magnesium carbonate as a stiffener or drier. In some instances it may be desirable to use a stiffener consisting of a mixture of calcium carbonate or magnesium carbonate with any of the stiffeners or driers hereinbefore mentioned.

I desire it understood that my invention is not limited to the use of the particular reagents named as it includes any substance or substances having the desired effect.

The furnace or rotary kiln employed for heating the mixture may be of any desired construction, but it is important that the lining of the furnace or kiln be of a basic or neutral material in order that said lining, under the action of the high heat, will be chemically inert to the materials being heated. I prefer to make this lining of a mixture of magnesite or of ground magnesia or magnesite brick or chrome brick with Portland cement in the proportions of one part cement to two or three parts of the magnesite or ground brick, which mixture may be made into a lining of any desired thickness by manipulating the mixture with water in the same manner as ordinary concrete. This lining, it will be found, successfully withstands high temperatures, variations in temperature, and is economical to replace. This mixture may be made and molded into forms of any desired shape allowed to set and then placed in the shell of the kiln in the ordinary manner. In place of the magnesite or ground brick mentioned, I may use any other refractory, neutral or basic material suitable for the purpose. If it is desired to increase the porosity of the lining, a small percentage of carbonaceous material such as sawdust or straw may be added, which will burn out quickly in the furnace in which the lining is placed. About five per cent. by volume of this material to the volume of the refractory mixture will give the desired porosity. Tenacity may also be given to the refractory material by adding a small percentage of asbestos fiber, say in a quantity of from 5 to 10% by weight of the weight of the refractory material. This lining is new with me and will be made the subject matter of a separate application.

I desire it understood that the invention may be performed by any suitable apparatus which will properly mix the reagent with the phosphatic material to form the fluid mixture and to add the drier thereto, and mix it thoroughly therewith, also that any suitable heating apparatus may be employed for subjecting the entire mixture to the converting temperature, although I preferably employ a rotary kiln for this purpose.

In Fig. 1 of the drawings I show a receptacle 1 in which the finely ground or pulverized phosphatic material and reagent are mixed by means of a power driven stirring apparatus 2, the same being driven through a beveled gear 3 by a beveled gear 4 mounted on a power shaft 5. Leading from the receptacle 1 is an outflow conduit 6 discharging into a mixer trough 7, said conduit being provided with a valve 8 to control the flow of the fluid mixture thereto. $8^a$ designates a supply receptacle adapted to hold a stiffener or drier to be mixed with the fluid mixture of phosphatic material and reagent which is fed into the mixing trough 7. The stiffening material if coke, coal or magnesium or calcium carbonate is pulverized previous to being placed in receptacle $8^a$, and is fed therefrom by means of a conveyer chain 9 through a trough or conduit 10 to the inlet end of the mixing trough 7. The mixing trough contains an agitator of any suitable form, but which may be in the form of a shaft 11 provided with a screw blade 12, cut flights, lugs 13 or other suitable beaters. The agitating means serves to thoroughly disseminate the stiffening material throughout the fluid mass and reduces it to a substantially plastic condition. At its outlet end the mixing trough is connected to a conduit 14 through which the screw blade 12 extends, and which blade operates to propel the mixture through the trough 7 and conduit 14 to a hopper 15 at the upper end of an inclined chute 16, the lower end of which enters and discharges into the upper end of a rotary kiln body 17, as clearly shown in dotted lines in Fig. 2. The rotary kiln is of any well-known structure suitable for the purpose. I do not limit myself to the length or diameter of the kiln, or the speed at which it is rotated, as these may be varied without departing from the spirit or scope of my invention.

What I claim and desire to secure by Letters Patent of the United States, is:—

1. The process of treating phosphatic material to render the contained phosphoric acid citrate soluble, which consists in forming a fluid mixture of the said material and a reagent, treating the fluid mixture to reduce it to a substantially plastic state, and then subjecting the substantially plastic mixture to a high temperature sufficient to render the phosphoric acid citrate soluble.

2. The process of treating phosphatic material to render the contained phosphoric acid citrate soluble, which consists in forming a fluid mixture of the said material and a reagent, adding to the fluid mixture a stiffener or drier in sufficient quantity to reduce the mixture to a substantially plastic state, and then subjecting the mixture to a high temperature sufficient to render the phosphoric acid citrate soluble.

3. The process of treating phosphatic material to render the contained phosphoric acid citrate soluble, which consists in forming a fluid mixture of the said material and a reagent in such proportions as to render the said acid citrate soluble in the presence of high heat, then adding to the mixture a stiffener or drier to reduce the mixture to a substantially plastic state, and then subjecting the mixture to a high temperature, rendering the phosphoric acid citrate soluble.

4. The process of treating phosphatic material to render the contained phosphoric acid citrate soluble, which consists in forming a fluid mixture of the said material and a reagent, then adding sawdust in sufficient quantity to reduce the mixture to a substantially plastic state, and then subjecting the mixture to a high temperature sufficient to render the phosphoric acid citrate soluble.

5. The process of treating phosphatic material to render the contained phosphoric acid citrate soluble, which consists in forming a fluid mixture of the said material and a reagent, adding to the mixture a stiffener or drier consisting of a mixture of sawdust and an alkaline earth substance, and subjecting the mixture to a temperature sufficient to render the phosphoric acid citrate soluble.

6. The process of treating phosphatic material to render the contained phosphoric acid citrate soluble, which consists in grinding the phosphatic material with sodium sulfate and water, and thoroughly mixing with the mass carbonaceous material in a fine condition to form a plastic mass, and heating the mixture to a high temperature.

7. The process of treating phosphatic material to render the contained phosphoric acid citrate soluble, which consists in grinding the phosphatic material with sodium sulfate and water, and thoroughly mixing with the mass carbonaceous material in a fine condition to form a plastic mass, and heating the mixture to a temperature of 2300° to 2600° F.

8. The process of treating phosphatic material to render the contained phosphoric acid citrate soluble, which consists in adding water to the phosphatic material and a reagent to form a miscible mass, mixing the mass, reducing the fluidity of the mass by mixing therewith a drying agent, and then calcining the mass at a temperature sufficiently high to render the phosphatic material citrate soluble.

9. The process of treating phosphatic material to render the contained phosphoric acid citrate soluble, which consists in adding water to the phosphatic material and a reagent to form a miscible mass, mixing the mass, reducing the fluidity of the mass by mixing therewith a carbonaceous material, and then calcining the mass at a temperature sufficiently high to render the phosphatic material citrate soluble.

10. The process of treating phosphatic material to render the contained phosphoric acid citrate soluble, which consists in making a mixture of the phosphatic material, a reagent and water in quantity sufficient to make efficient mixing of said material and reagent, reducing the fluidity of the mixture to a consistency suitable for calcining by mixing therewith a drying agent, and then calcining the mass at a temperature sufficiently high to render the phosphatic material citrate soluble.

In testimony whereof I have hereunto signed my name in the presence of two subscribing witnesses.

ELLIS C. SOPER.

Witnesses:
C. G. HEYLMUN,
E. M. LOCKWOOD.